(12) United States Patent
Leeman et al.

(10) Patent No.: US 6,695,491 B1
(45) Date of Patent: Feb. 24, 2004

(54) DETENT FOR OPTICAL FIBRES

(75) Inventors: Sam Leeman, Leuven (BE); Luiz Neves Mendes, Begijnendijk (BE); Dirk Kempeneers, Aarschot (BE); Lodewijk Van Noten, Leuven (BE); Philippe Kalmes, Hasselt (BE)

(73) Assignee: Tyco Electronics Raychem N.V. (BE)

( * ) Notice: Subject to any disclaimer, the term of this patent is extended or adjusted under 35 U.S.C. 154(b) by 0 days.

(21) Appl. No.: 09/980,931

(22) PCT Filed: May 30, 2000

(86) PCT No.: PCT/GB00/02069

§ 371 (c)(1),
(2), (4) Date: Dec. 5, 2001

(87) PCT Pub. No.: WO00/75704

PCT Pub. Date: Dec. 14, 2000

(30) Foreign Application Priority Data

Jun. 9, 1999 (GB) .............................. 9913264

(51) Int. Cl.$^7$ ................................. G02B 6/36
(52) U.S. Cl. ........................................ 385/87
(58) Field of Search ................ 385/87, 88, 89, 385/90, 91–94

(56) References Cited

U.S. PATENT DOCUMENTS

| | | | |
|---|---|---|---|
| 4,645,295 A | * | 2/1987 | Pronovost ................... 385/55 |
| 5,166,997 A | | 11/1992 | Norland et al. ............... 385/87 |
| 5,371,827 A | * | 12/1994 | Szegda ....................... 385/136 |
| 5,458,019 A | | 10/1995 | Trevino ...................... 74/502.4 |

FOREIGN PATENT DOCUMENTS

| | | |
|---|---|---|
| DE | 3640695 | 6/1988 |
| EP | 0 809 340 | 11/1997 |
| FR | 2 747 201 | 10/1997 |

OTHER PUBLICATIONS

Copy of PCT Search Report for PCT/GB00/02069.

Copy of British Search Report for GB 9913264.9 dated Nov. 17, 1999.

* cited by examiner

Primary Examiner—Chandrika Prasad
(74) Attorney, Agent, or Firm—Myers Bigel Sibley & Sajovec

(57) ABSTRACT

Detent devices for optical fibre members have an outer casing member with a tapered aperture in which an inner engagement member is slidably fitted. A strength member of the optical fibre member received in the inner engagement member can be wrapped back around a boss of the inner engagement member and is clamped by the slidable engagement member when the optical fibre member is pulled. Thus axial strain relief is provided.

19 Claims, 3 Drawing Sheets

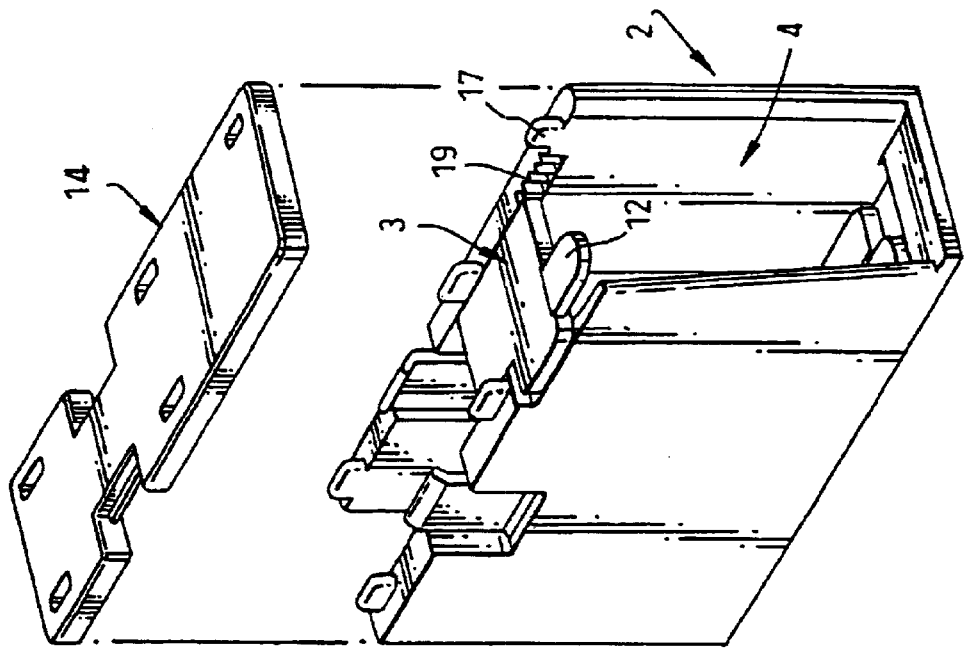
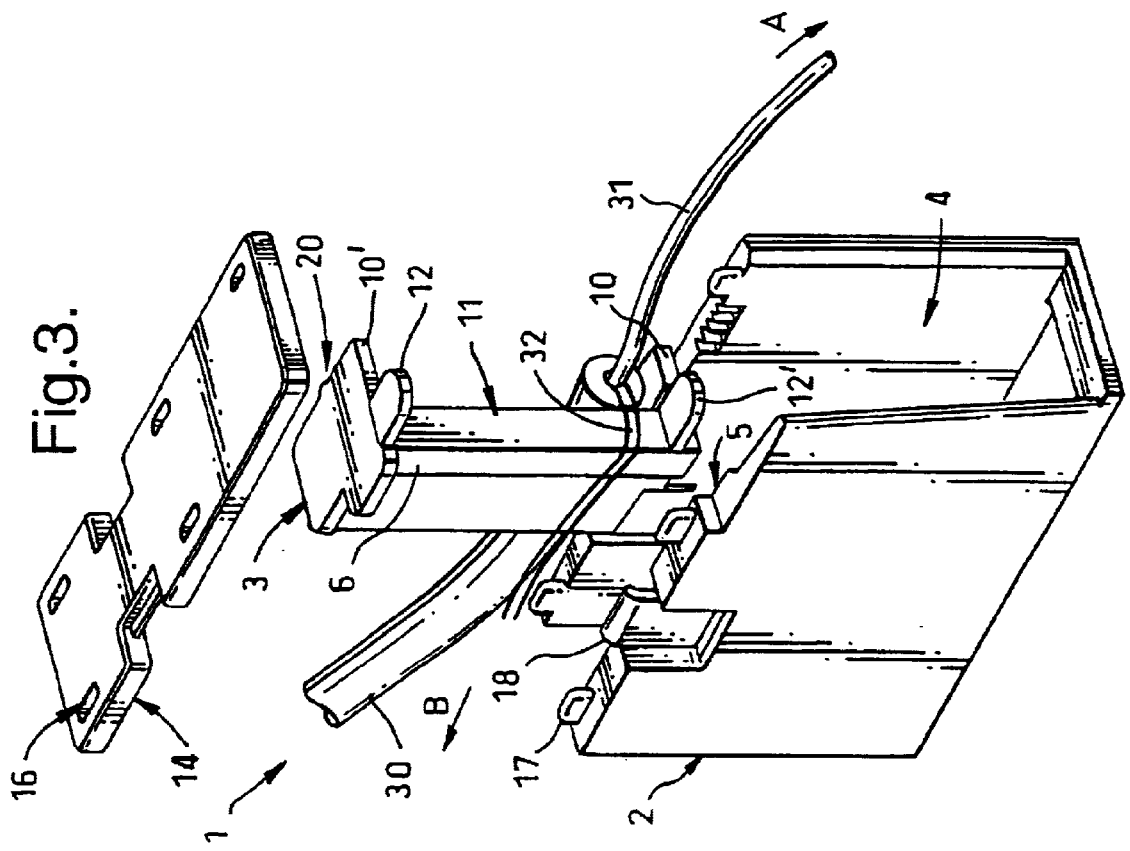

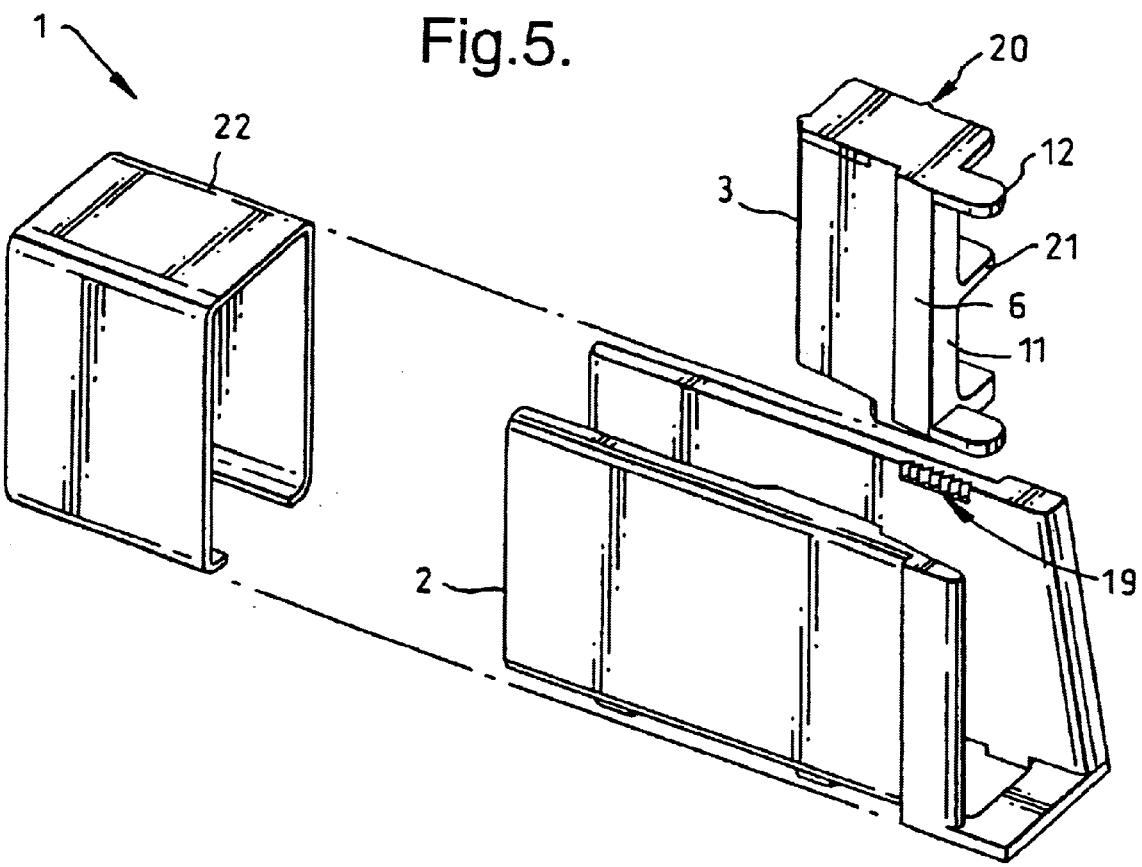
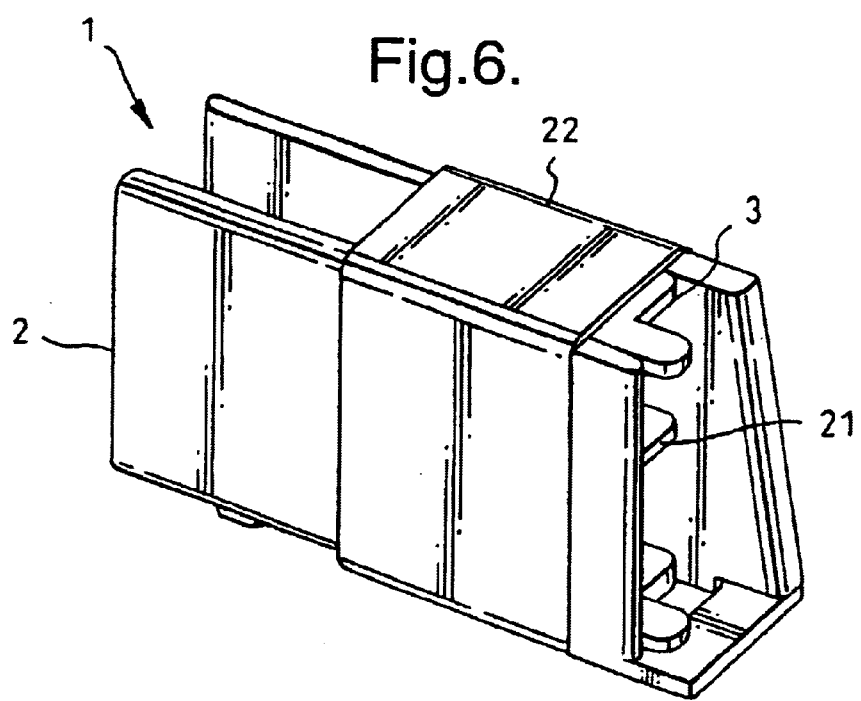

DETENT FOR OPTICAL FIBRES

RELATED APPLICATIONS

The present application is a National Phase application of PCT/GB00/02069 filed on May 30, 2000 and published in English, which claims priority from Application GB 9913264.9 filed on Jun. 9, 1999.

FIELD OF THE INVENTION

The present invention relates to detents for optical fibre members. More particularly, the present invention relates to detent devices providing strain relief for an optical fibre member incorporating at least one optical fibre and at least one flexible tensile strength member.

BACKGROUND OF THE INVENTION

Detent devices serve to provide axial strain relief for cables (the term "cables" is meant to include both copper cables and optical fibre members). That is, when a cable is pulled, the detent device ensures that the pulling force does not act upon the conductor which may be pulled loose from a connector. In particular in the case of optical fibre cables, the relatively brittle optical fibres should not be pulled as they easily break. An example of an optical fibre detent device is described in U.S. Pat. No. 5,166,997 to Norland et al.

Optical fibre members are often provided with a strength member. The optical fibre member then comprises one or more optical fibres, one or more strength members, and a sheath. The strength member is preferably made of a flexible material having a high pulling strength. Often KEVLAR®, a commercially available aramid fibre, is used for this purpose. The detent device causes any pulling force exerted on the optical fibre member to act upon the strength member and not on the optical fibre(s).

The detent device of U.S. Pat. No. 5,166,997 has an inner engagement member around which the threads of the strength member can be wrapped back. A band of elastomeric material is then placed over the wrapped portion of the strength member. The band rests in a groove in the outer surface of the inner engagement member. The strength member is thus affixed to the inner engagement member. Subsequently, a washer acting as a pressure plate is placed against the inner engagement member and is secured by a screw threaded casing, thus preventing any movement of the inner engagement member.

Although this known device provides a good strain relief, its application is relatively complicated and time-consuming. In addition, the device consists of a large number of parts, making it relatively expensive.

German Patent Application DE 3 640 695 discloses a detent device for optical fibre cables. The device comprises two substantially identical conical tubular parts which can move relative to each other to engage the strength member of an optical fibre cable and which are together held in a housing. The cable has to be threaded through the tubular parts to be accommodated in the device.

French Patent Application FR 2 747 201 discloses optical fibre cables and cable clamps for clamping such cables. A mechanism for clamping the strength member of an optical fibre cable is not disclosed.

SUMMARY OF THE INVENTION

It is an object of the present invention to avoid these and other disadvantages of the Prior Art and to provide a detent device which is easy to install and which does not require the optical fibre member to be threaded through the device.

It is another object of the present invention to provide a detent device which is economical.

It is a further object of the present invention to provide a detent device having a minimal number of components.

To meet these and other objects, a detent device as defined in the preamble is according to the present invention characterised in that the inner engagement member is movably received in the outer engagement member, in that the inner engagement member comprises at least one boss for wrapping back strength members, the at least one boss providing an outer wall of the said engagement member for clamping at least one strength member, and in that each boss is provided with a retaining tab for retaining one or more strength members.

The present invention is based upon the insight that the tapered arrangement of the engagement members is self-tightening. That is, the strength member wrapped back around the inner engagement member will close any gap between the engagement members when pulled, thus securing itself. There is no need for retaining bands or pressure plates, which reduces the number of components. Also, not having to apply a number of components facilitates the installation of the detent device.

It is noted that International Patent Application WO 98/35415 (Raychem) discloses a self-tightening cable clamp having a sliding part. However, this known device clamps the outside of the cable, thus exerting pressure on the cable body. Although slits are provided for securing flexible strength members of optical fibre cables, no means are provided for wrapping back and clamping these flexible strength members. Axial pull relief is in particular provided by securing a central strength member by an axial screw driven jaw member.

To facilitate the application of the strength member(s) the design of the detent device is such that the inner engagement member comprises at least one boss for wrapping back strength members, the at least one boss providing an outer wall of the said engagement member for clamping at least one strength member. Such a boss preferably extends perpendicularly to the direction of the optical fibre member. To avoid the strength members slipping off the boss and to make the installation of the device easier, each boss is provided with a retaining tab for retaining one or more strength members.

The detent device of the present invention can be arranged to accommodate a single optical fibre member. However, a very compact termination of a plurality of optical fibre members may be obtained when the inner engagement member is arranged for accommodating at least two optical fibre members.

As the inner engagement member may be loosely accommodated in the outer engagement member, preferably a lid is provided for closing off the outer engagement member so as to retain the inner engagement member and any optical fibre member accommodated therein. Advantageously, the lid is provided with at least one stabilising slot for receiving any stabilising fingers protruding from the outer engagement member so as to prevent any outward flexing of the outer engagement member. Such an arrangement allows much higher tensile forces as the shape and size of the outer engagement member are maintained.

Advantageously, the lid is provided with a plurality of stabilising slots for stabilising fingers. In addition, the outer engagement member may be provided with securing clamps for lockingly securing the lid.

A reduction of the number of components and an easier installation are obtained when the lid is integral with the outer engagement member.

Instead of, or in addition to the lid, a substantially U-shaped clip may be used to hold both the inner member and the walls of the outer member in their respective positions. Such a clip is preferably made of metal and may substantially enclose part of the outer engagement member.

The accommodation of two or more optical fibre members may be achieved in several ways. In a first embodiment, the inner member comprises two parallel bosses. That is, when two optical fibre members are used, each such member has its own boss. In a second embodiment, the inner engagement member comprises a single boss. That is, the single boss is shared between optical fibre members. In the latter embodiment, the boss is preferably elongate and has retaining tabs at both ends.

The inner engagement member could be loosely received in the outer engagement member so as to allow movement in virtually all directions. Preferably, however, guiding means are provided for guiding the movable inner engagement member in the outer engagement member. The guiding means may also retain the inner engagement member.

Preferably, the guiding means comprise a protrusion receivable in a slot in the inner engagement member. Advantageously, the protrusion is shaped so as to retain the inner engagement member, for example by being widened beyond the slot.

To maintain the locking position of the inner engagement member in the aperture the detent device of the present invention is preferably designed such that the inner engagement member is provided with at least one interlocking protrusion for interlocking with a serrated surface of the aperture. The protrusion and serrations are advantageously shaped so as to allow movement in the engaging direction and to resist movement in the disengaging direction of the device.

The invention also provides a kit-of-parts for forming a detent device as described above, as well as an optical fibre organiser provided with a detent device as described above.

In summary, the present invention provides a wrap-around detent device for optical fibre members incorporating at least one optical fibre and at least one flexible tensile strength member, the device comprising a casing and a detent means movably receivable within the casing, the casing and/or the detent means having a tapering surface and being arrangeable in use to form a gap between them such that:

(a) an optical fibre member can be inserted laterally into the casing so that its optical fibre(s) extend through the casing in a first direction, (b) the strength member of the optical fibre member can be wrapped back around the movable detent means to extend into (preferably through) the said gap in a second direction at least different from (preferably opposite to) the said first direction, and (c) tension applied to the optical fibre member in the said second direction moves the detent means so as to narrow the said gap and grip (or grip more tightly) the strength member therein, thus resisting transmission of the applied tension to the optical fibre(s) themselves.

BRIEF DESCRIPTION OF THE DRAWINGS

The present invention will further be explained below with reference to exemplary embodiments illustrated in the accompanying drawings, in which identical reference numerals are used for similar parts, and in which:

FIG. 3 schematically shows, in perspective, a second embodiment of a detent device according to the present invention;

FIG. 4 schematically shows, in perspective, the partially assembled detent device of FIG. 3;

FIG. 5 schematically shows, in perspective, a third embodiment of a detent device according to the present invention;

FIG. 6 schematically shows, in perspective, the assembled detent device of FIG. 5.

DETAILED DESCRIPTION OF THE ILLUSTRATED EMBODIMENTS

Figure 1:
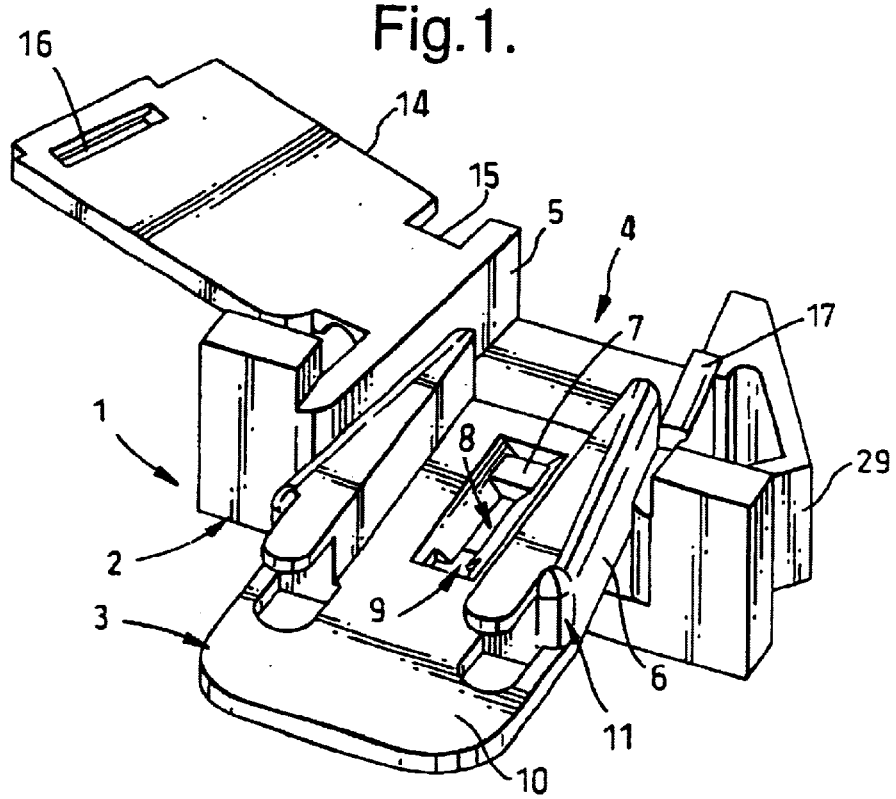
FIG. 1 schematically shows, in perspective, a first embodiment of a detent device according to the present invention.

The detent device 1 shown merely by way of non-limiting example in FIG. 1 comprises an outer engagement member or casing 2 and an inner engagement member or detent means 3. The outer engagement member 2 (hereinafter also referred to as "outer member") defines a tapered aperture 4. The tapered inner engagement member 3 (hereinafter also referred to as "inner member") is slidably received in the aperture 4.

To guide the sliding movement and to retain the inner member 3 relative to the outer member 2, guiding means are provided. These guiding means comprise a protrusion 7 integral with the outer member 2 and a slot 8 in the base plate 10 of the inner member 3. The slot 8 has at one end a widened portion or opening 9 which is large enough for the guiding protrusion 7 to pass through so as to enable assembly of the parts.

The slot 8 has slanting walls resulting in a substantially V-shaped cross-section. The guiding protrusion 7 has a matching shape so as to retain the inner member 3.

Figure 2:
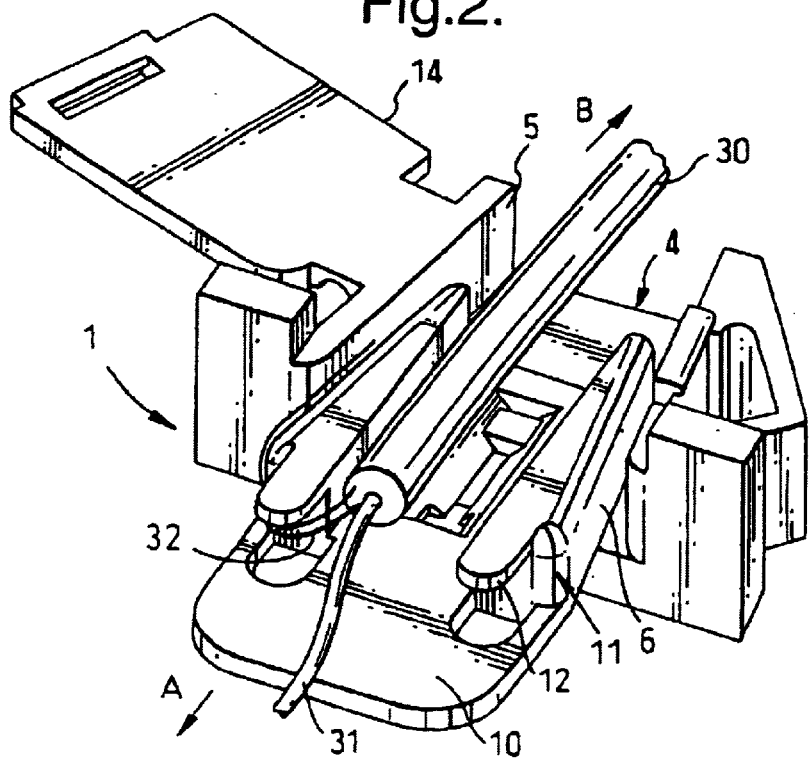
FIG. 2 schematically shows, in perspective, the detent device of FIG. 1 in which an optical fibre member has been accommodated.

Two bosses 11 protrude from the base plate 10 of the inner member 3. Each boss 11 is provided with a tab 12 and a clamping surface 6 constituting the said outer surface of the inner member 3. The tabs 12 serve to guide and retain the strength member(s) 32 of an optical fibre member 30 inserted in the detent device 1, as shown in FIG. 2. An optical fibre 31 of the optical fibre member 30 extends in a first, forward direction A. The strength member(s) 32 are wrapped back around the boss 11 of the inner member 3 so as to extend in a second, reverse direction B.

When the optical fibre member 30 is pulled in the direction B, its strength member(s) 32 will exert a pulling force on the boss 11 and therefore on the inner member 3, causing the latter to move in the direction B and thereby to clamp the strength member(s) 32 between the surfaces 5 and 6 of the outer and inner members respectively. The detent device of the present invention is thus self-tightening or self-clamping. This is a very advantageous property which facilitates both the insertion of an optical fibre member into the device and the removal from it. An optical fibre member 30 is therefore simply laid into the device 1, the strength member 32 is wrapped back around the boss 11 and the inner member is slid in the direction B to secure the strength member. Then the lid 14 is closed to retain the optical fibre member and to hold the walls of the outer member 2 together. That is, the lid resists flexing of the walls of the outer member. Thus a widening of the aperture 4 and a consequent lessening of the clamping action of the device is prevented. To hold the walls together, the lid 14 is connected to one wall of the outer member by a hinging part 15 and to the other wall by a locking protrusion 17 which is engaged by a locking slot 16 in the lid. The hinging part 15 consists in the embodiment shown of a thinner portion of the lid 14 which is integral with the outer member 2.

As this embodiment consists of only two components, it can economically be made and assembled. It is possible to produce the detent device 1 as a one-component device, the inner member 3 being integral with the outer member 2. In that case the inner and outer members could be connected by flexible bands, integral with the members, which would allow the sliding action required for the clamping of the strength members. However, it is preferred to use two separate parts, as shown in the figures. A resilient hook 29, integral with the outer member 2, is provided for securing the device 1 in a suitable support (not shown).

As can be appreciated from FIGS. 1 and 2, the detent device of the present invention is a "wrap-around" device in that there is no need for the optical fibre member to be threaded through the device. This allows an easy installation, also on uncut optical fibre members.

In FIG. 2 only a single optical fibre member 30 is shown to be accommodated in the inner member 3. It is, however, possible to accommodate two optical fibre members side-by-side, each boss 11 being used for wrapping back the strength member(s) of a respective optical fibre member. Instead of the two separate optical fibre members, a ribbon-type optical fibre member having two elements (e.g. a so-called ribbon pigtail) can be accommodated.

It is noted that in this embodiment, the strength members of the parallel optical fibre members are folded around the substantially longitudinal bosses 11 away from each other, parallel to the base plate 10. It would be possible to extend the height of the bosses 6 to be able to accommodate a stacked array of optical fibre members. However, such an arrangement would limit access to the lowermost optical fibre members resting on the base plate 10. For this reason, when an extended boss 11 is used allowing the strength members of a plurality of optical fibre members to be wrapped, preferably only one such boss is present on the base plate. Such an arrangement is shown in FIGS. 3 and 4.

In the embodiment of FIGS. 3 and 4, a boss 11 extends from a (lower) base plate 10 and is provided with a tab 12, as in the first embodiment of FIGS. 1 and 2. However, an additional (upper) plate 10' and an additional (lower) tab 12' provide a symmetrical structure. The boss 11 has an outer wall 6 which, in co-operation of the inner wall 5 of the outer member 2, provides a clamping action, as in the first embodiment. Separate guide means (such as the elements 7, 8 and 9 in FIG. 1) are not provided in the embodiment shown and the movement of the inner member 3 is guided by the walls of the outer member 2.

In this second embodiment, four optical fibre members may be accommodated in parallel. To organise the optical fibre members, dividers (21 in FIG. 5) may be provided to create two or four compartments for accommodating one or two optical fibre members each. Such dividers are advantageously integral with the inner member 3 so as to minimise the number of parts. Instead of four separate members, an integral ribbon-type optical fibre member having several interconnected members may be accommodated.

An improved self-locking action may be obtained when the inner member 3 is provided with a tooth 20 protruding from the upper plate 10', which tooth 20 is engaged by a serrated surface 19 when the device 1 is assembled. These interlocking means 19, 20 allow a tightening but resist a loosening of the clamping action. The first embodiment may also be provided with such interlocking means or with non-locking friction means, for example teeth protruding from the bottom surface of the base plate 10 and engaging a (serrated) surface of the outer member 2.

While in the first embodiment the entire aperture 4 is tapered, in the second embodiment only part of the aperture 4 has a tapering surface 5. Similarly, in this embodiment only part of the inner member 3 has a tapering surface 6 designed to co-operate with the surface 5. The surfaces 5 and 6 define a gap which is narrowed or substantially closed when tension is applied in the direction B, thus gripping the strength member and protecting the optical fibre 31 from any undesirable tension.

The lid 14 is shown to be a separate component, bringing the total number of components of this embodiment to three. Depending on the choice of material of the outer member 2, the lid 14 may be integral with the outer member 2, connected by a flexible hinging part (15 in FIG. 1). The lid 14 is positioned by stabilising protrusions or fingers 17 and secured by clamps 18. The fingers 17 also serve to avoid any outward flexing of the walls of the outer member when the lid 14 is closed.

In this embodiment, it is preferred to remove the inner member 3 from the outer member 2 before inserting any optical fibre members. After wrapping the strength members back around the boss 11, the inner member 3 is re-inserted, together with the fibre members. Subsequently the lid 14 is put on to secure the optical fibre members and the inner member 3. It will be appreciated that this embodiment also is a "wrap-around" device as an optical fibre member can be inserted sideways, without any threading through.

Instead of or in addition to a lid 14, a substantially U-shaped clip 22 can be used to secure the inner member 3 and to prevent any flexing of the walls as in the embodiment shown in FIGS. 5 and 6. Preferably such a clip is made of metal. When such a clip is used the lid (14 in FIG. 3) may be omitted.

The components of the detent device 1 in this and other embodiments are (other than the clip 22) preferably made of plastics material, preferably by injection moulding of the respective outer (casing) member and inner (detent) member. Suitable materials and manufacturing techniques are readily selectable by persons familiar with such technology.

The embodiments of FIGS. 3–6 are particularly suitable for use in organiser trays for optical fibres due to their compact design.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A detent device for optical fibre members incorporating at least one optical fibre and at least one flexible tensile strength member, the device comprising an outer engagement member defining a tapered aperture and a tapered inner engagement member receivable in the aperture, the inner engagement member being arranged to accommodate an optical fibre member and wrap the optical fibre member's at least one strength member back separated from the at least one optical fibre so that at least part of the at least one strength member is situated between an inner wall of the aperture and an outer wall of the inner engagement member so as to provide pull relief, wherein the inner engagement member is received in the outer engagement member so as to clamp the at least one strength member between the inner engagement member and the inner wall of the aperture when the optical fibre member is pulled, wherein the inner engagement member is movably received in the outer engagement member and wherein the inner engagement member comprises at least one boss that wraps back the at least one strength members member, the at least one boss providing an outer wall, and wherein the at least one boss is provided with a retaining tab that retains the at least one strength member.

2. A detent device according to claim 1, wherein the inner engagement member is arranged to accommodate at least two optical fibre members.

3. A detent device according to claim 1, wherein a lid is provided that closes off the outer engagement member so as to retain the inner engagement member and the optical fibre member accommodated therein.

4. A detent device according to claim 3, wherein the lid is provided with at least one stabilising slot that receives one or more stabilising fingers protruding from the outer engagement member so as to limit outward flexing of the outer engagement member.

5. A detent device according to claim 4, wherein the lid is provided with a plurality of stabilising slots for receiving the one or more stabilising fingers.

6. A detent device according to claim 5, wherein the outer engagement member is provided with securing clamps that secure the lid.

7. A detent device according to claim 3, wherein the lid is integral with the outer engagement member.

8. A detent device according to claim 1, wherein a substantially U-shaped clip is provided to retain the inner engagement member and/or to limit outward flexing of the outer engagement member.

9. A detent device according to claim 1, wherein the inner member comprises two parallel bosses.

10. A detent device according to claim 1, wherein the inner engagement member comprises a single boss.

11. A detent device according to claim 10, wherein the boss is provided with retaining tabs at both ends.

12. A detent device according to claim 1, wherein guiding means are provided for guiding the inner engagement member in the aperture of the outer engagement member, the guiding means comprising a protrusion receiving in a slot in the inner engagement member.

13. A detent device according to claim 1, wherein the inner engagement member is provided with at least one interlocking protrusion that interlocks with a serrated surface of the aperture.

14. An optical fibre organizer tray, for optical fibre members incorporating at least one optical fibre and at least one flexible tensile strength member, the tray comprising a detent device, the detent device comprising an outer engagement member defining a tapered aperture and a tapered inner engagement member receivable in the aperture, the inner engagement member being arranged to accommodate an optical fibre member and wrap the optical fibre member's at least one strength member back separated from the at least one optical fibre so that at least part of the strength member is situated between an inner wall of the aperture and an outer wall of the inner engagement member so as to provide pull relief, wherein the inner engagement member is received in the outer engagement member so as to clamp the at least one strength member between the inner engagement member and the inner wall of the aperture when the optical fibre member is pulled, wherein the inner engagement member is movably received in the outer engagement member and wherein the inner engagement member comprises at least one boss that wraps back the at least one strength member, the at least one boss providing an outer wall, and wherein the at least one boss is provided with a retaining tab that retains the at least one strength member.

15. A detent device for an optical fibre member including at least one optical fibre and at least one separable flexible tensile strength member, the device comprising:

an outer engagement member having an aperture therein;

an inner engagement member movably positioned in the aperture to define a region between an inner wall of the aperture and an outer wall of the inner engagement member configured to receive and clamp the at least one tensile strength member when the at least one tensile strength member is separated from the optical fibre;

wherein the inner engagement member comprises:

a longitudinally extending passage configured to receive the optical fibre member through a first end thereof and to pass the optical fibre, separated from the tensile strength member, through an opposite end thereof;

a base member having an inner surface defining a portion of the longitudinally extending passage; and at least one boss extending from the inner surface of the base member and defining the outer wall of the inner engagement member, the at least one boss being configured to receive the at least one tensile strength member, separated from the optical fibre, at the opposite end of the longitudinally extending passage and extend the at least one tensile strength member towards the first end of the longitudinally extending passage when the at least one tensile strength member is wrapped around the at least one boss.

16. The detent device of claim 15 wherein the at least one boss further comprises a retaining tab that retains the at least one strength member when the at least one strength member is wrapped around the at least one boss.

17. The detent device of claim 15 wherein the inner engagement member further comprises a slot and wherein the outer engagement member further comprises a protrusion positioned to be received in the slot to guide the inner engagement member in the aperture.

18. The detent device of claim 17 wherein the slot is in the base member.

19. A detent device for an optical fibre member including at least one optical fibre and at least one separable flexible tensile strength member, the device comprising:

an outer engagement member having an aperture therein;

an inner engagement member movably positioned in the aperture to define a region between an inner wall of the aperture and an outer wall of the inner engagement member configured to receive and clamp the at least one tensile strength member when the at least one tensile strength member is separated from the optical fibre;

wherein the inner engagement member comprises:
- a longitudinally extending passage configured to receive the optical fibre member through a first end thereof and to pass the optical fibre, separated from the tensile strength member, through an opposite end thereof;
- at least one boss defining the outer wall of the inner engagement member, the at least one boss being configured to receive the at least one tensile strength member, separated from the optical fibre, at the opposite end of the longitudinally extending passage and extend the at least one tensile strength member towards the first end of the longitudinally extending passage when the at least one tensile strength member is wrapped around the at least one boss; and
- a retaining tab extending from the at least one boss that retains the at least one strength member when the at least one strength member is wrapped around the at least one boss.

* * * * *